GOTTFRIED HOHLFELD
HEINZ MARTIN
INVENTORS.

BY Karl F. Ross
Attorney

GOTTFRIED HOHLFELD
HEINZ MARTIN
    INVENTORS.

United States Patent Office 3,333,617
Patented Aug. 1, 1967

3,333,617
FIELD CHOPPER FOR HARVESTER
Gottfried Hohlfeld and Heinz Martin, Neustadt, Germany, assignors to Veb Kombinat Fortschritt, Landmaschinen, Neustadt, Saxony, Germany, a corporation of Germany
Filed May 5, 1965, Ser. No. 453,399
8 Claims. (Cl. 146—107)

Our present invention relates to agricultural harvesters of the type wherein a chopper drum is rotatable about a horizontal axis within a housing having an inlet through which agricultural crops, generally in the form of stalks, are fed to the chopper blades of the drum by a suitable conveyor for comminution and discharge at a remote outlet.

Field choppers of this description are frequently designed as attachments for a tractor by which they are towed, together with the associated conveyor, along a row of freshly cut stalks to be picked up and comminuted preparatorily to deposition on an accompanying wagon. At certain points in the operation, e.g. when the assembly turns from one row into the next, little or no crop material is being picked up so that the chopper spins idly. The conveyor, however, may entrain rocks or pebbles which, upon entering the orbit of the swirling chopper blades, are propelled by these blades forwardly through the inlet of the drum housing toward the tractor, thus endangering the driver or other persons standing in the vicinity of the vehicle.

It is, therefore, the general object of our invention to provide protective means in such chopper assembly preventing the forward propulsion of rocks, pebbles and the like by the chopper blades, especially during stages of operation when the feed of crop material is reduced or interrupted so that projectiles are not intercepted by oncoming stalks.

Certain protective devices previously proposed accomplished their purpose only imperfectly and, in particular, tended to interfere with the orderly flow of crop material toward the chopper drum. It is, accordingly, a more specific object of our invention to provide a protective device of this type which will not unduly impede the movement of stalks toward the drum and will not be easily obstructed by soil or organic matter in the normal operation of the unit.

In accordance with this invention we provide lateral extensions on the housing of a chopper drum for the swingable support of a gate forwardly of the housing inlet, this gate comprising a body of generally triangular cross-section in a vertical plane transverse to the drum axis. The gate body has a substantially planar front surface which normally depends substantially vertically from its swing axis and terminates in a lower edge which can be swung upwardly under the pressure of oncoming stalks toward the inlet of the drum housing for unblocking the latter. A further surface of the gate body extends from the aforementioned planar front surface toward the inlet, thus either from the region of the swing axis or from the lower edge of the front surface, so as to define by its own free edge the third corner of the triangular cross-section. If desired, a third surface may complete the triangular outline of the body.

Thus, the gate body has at least two surfaces or legs which include an acute angle with each other and which block or unblock the drum inlet only to the extent necessary to admit crop material delivered to this inlet by a conveyor, thereby intercepting any hard fragments projected forwardly and/or upwardly from the inlet by the chopper blades. The triangular configuration of the gate body locates its center of gravity in a position in which the front surface of the body will tend to extend vertically across the drum inlet just above the conveyor, the drum housing being advantageously provided with suitable abutments for limiting the swing of this body.

The invention will be described hereafter in greater detail, reference being made to the accompanying drawing in which.

Figure 1:
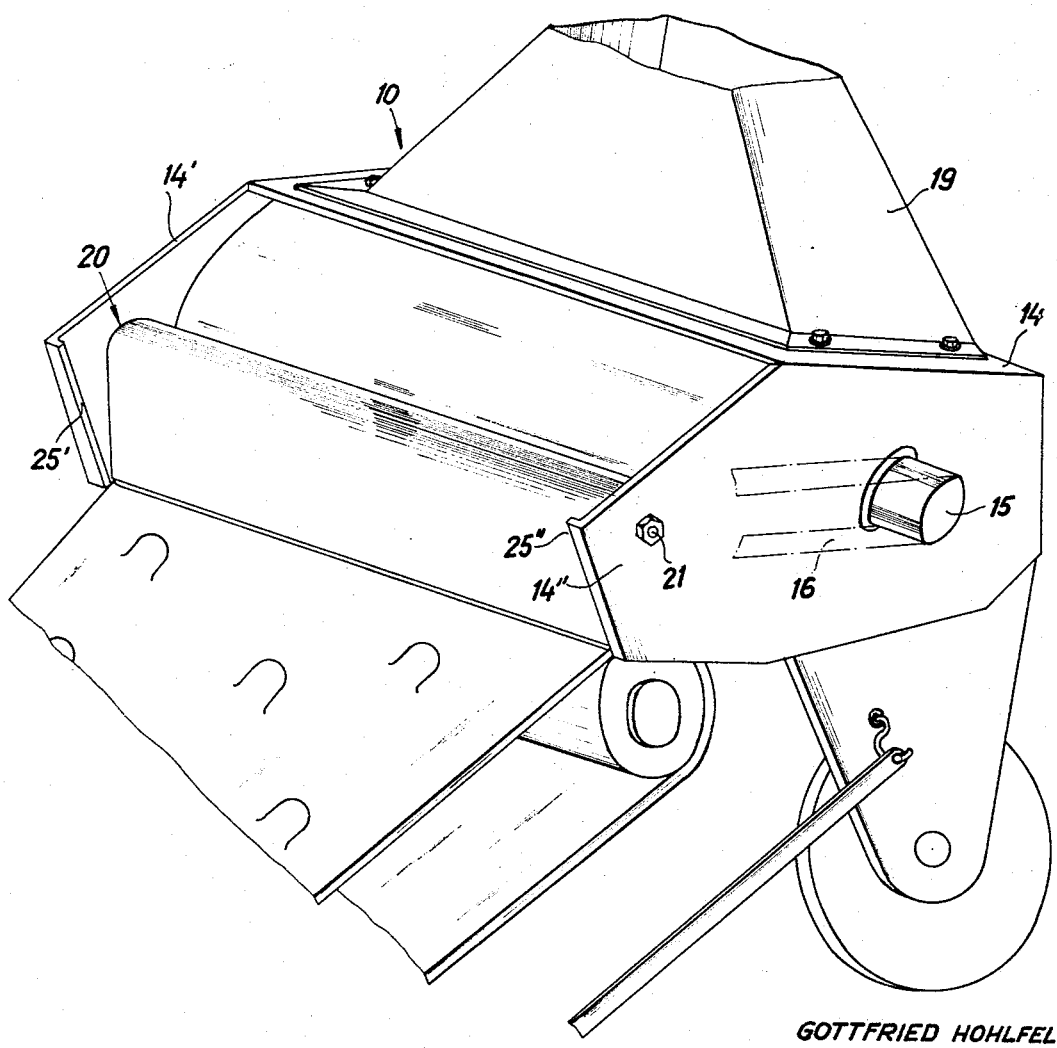
FIG. 1 is a perspective view of a field chopper equipped with a swingable gate according to the invention.

In FIG. 1 we have shown a field chopper 10 juxtaposed with a conveyor 11, the combined unit being attachable to a tractor (not shown) with the aid of a tow bar 12. A chopper drum 13 (FIG. 2) inside a housing 14 has a shaft 15 adapted to be continuously rotated in a clockwise direction (as viewed in FIG. 2) by a transmission from the tractor, indicated schematically at 16.

Figure 2:
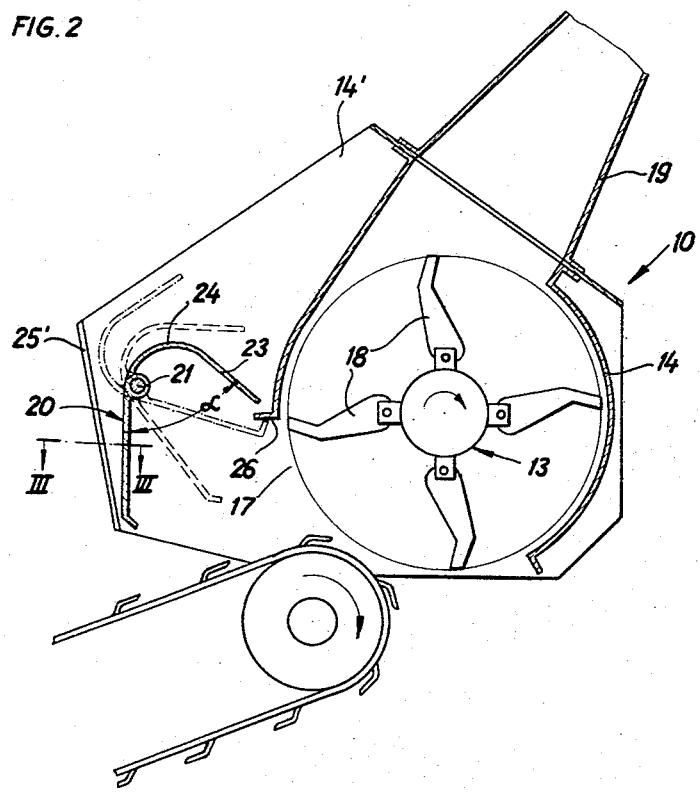
FIG. 2 is a cross-sectional view of the chopper shown in FIG. 1.
Figure 3:
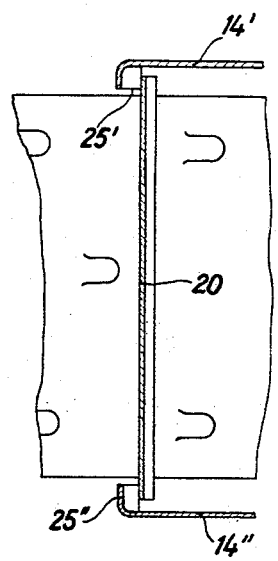
FIG. 3 is a fragmentary sectional view taken on the line III—III of FIG. 2.

In accordance with a feature of our invention, the housing 14 has a pair of lateral forward extensions 14′, 14″ ahead of its inlet 17 through which crop material entrained by the conveyor 11 may be delivered to the blades 18 of drum 13 for chopping and discharged through an outlet 19. A swingable gate 20 is pivotally mounted on extensions 14′, 14″, ahead of inlet 17, for tilting about a horizontal axis defined by a rod 21. The body of gate 20 is of generally triangular cross-section, as best seen in FIG. 2, and has a front surface 22 which depends vertically from the region of rod 21 in the normal position illustrated in FIGS. 1 and 2. A rear surface 23 includes with front surface 22 an acute angle α (here of about 55°), these surfaces being interconnected by a rounded edge 24 above the swing axis 21. The location of this swing axis in relation to the cross-section of body 20 is such that the latter will tend by gravity to assume the position illustrated in FIGS. 1 and 2 in which the lower edge of front surface 22 abuts a pair of lips 25′, 25″ on housing extensions 14′, 14″. In this closure position, any projectiles accelerated through inlet 17 by the blades 18 will be effectively intercepted by the legs 22, 23 of triangular body 20 so as not to constitute any danger to the operating personnel. A ledge 26 at the top of inlet 17, integral with housing 14, limits the upward swing of gate 20 when the latter is tilted into an open position by upwardly entrained crop material, this position having been indicated in dot-dash lines in FIG. 2. An intermediate position (dotted lines) will occur when the conveyor 11 operates only under partial load, it being apparent that the gate 20 will always intercept or deflect rocks and other particles which in the absence of this gate might be projected forwardly and/or upwardly at high speed. By virtue of the divergence of the two plate-shaped legs 22, 23 of body 20 there will be substantially no tendency for stalks, soil or other matter to become attached to that gate so as to block the passage of crop material toward inlet 17; if such matter should adhere, it can be readily dislodged.

If the ledges 25′, 25″ were omitted, ledge 26 could serve as an abutment for the outer edge of plate 23 to define the normal position of closure of gate 20.

Figure 4:
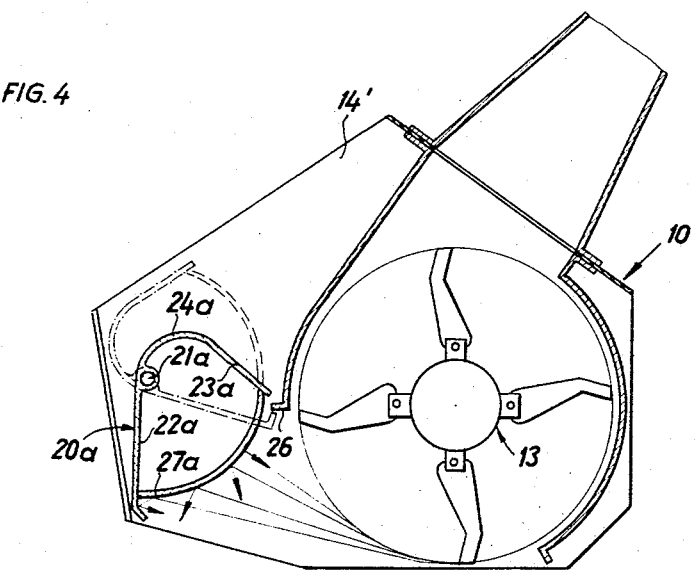
FIGS. 4 and 5 are views similar to FIG. 2, illustrating two modifications.

In FIG. 4 we have shown the gate 20 replaced by a gate 20a which differs from the former only by the presence of a third leg 27a spanning the legs 22a and 23a, the leg 27a having a surface curved about the swing axis 21a of the gate. An oppositely curved region above axis 21a is again shown at 24a. Curved surface 27a acts as a shield to prevent the intrusion of any foreign matter into the space between legs 22a and 23a, it being noted that the ledge 26 is disposed close enough to this surface to strip off any adhering particles when the gate 20a is swung between its two limiting positions respectively illustrated in solid and in dot-dash lines in FIG. 4.

Figure 5:
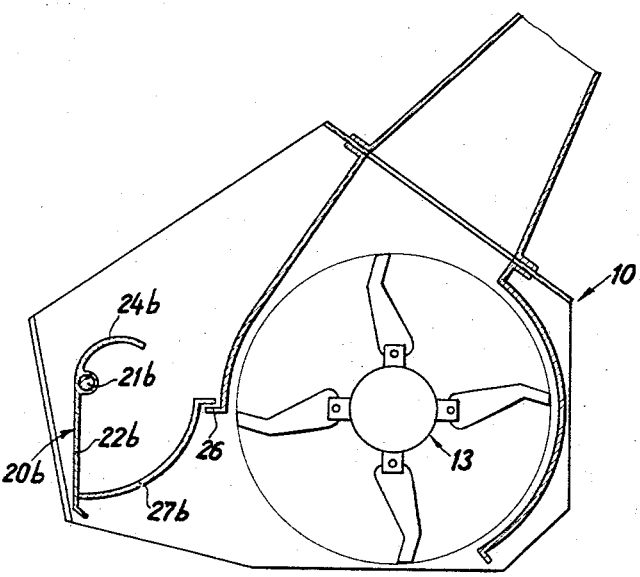

In FIG. 5 we have shown a further modification in the form of a gate 20b which is generally similar to gate 20a, except that the leg 23a has been omitted so that the gate consists only of front surface 22b, bottom surface 27b and the curved vertex surface 24b above swing axis 21b. Ledge 26 again acts as a stripper for surface 27b.

We claim:

1. In an agricultural harvester including a chopper drum rotatable about a horizontal axis, a housing for said drum provided with a forwardly open inlet for agricultural crops, conveyor means for feeding said crops to said inlet, and an outlet remote from said inlet for the discharge of crop material comminuted by said chopper, the combination therewith of a swinging gate disposed forwardly of said inlet above said conveyor means, said housing being provided with lateral extensions supporting said gate, said gate comprising a body of generally triangular cross-section in a vertical plane transverse to the drum axis, said body being pivotally secured to said extensions along a horizontal swing axis near one corner of the triangle and having a substantially planar front surface which depends substantially vertically from the region of said swing axis and terminates in a lower edge at another corner of said triangle in a position of closure of said gate while being swingable upwardly and rearwardly toward said inlet for unblocking the latter in an open position of said gate, said body having at least one further surface extending rearwardly from said front surface toward said inlet and terminating in an edge at the third corner of the triangle.

2. In an agricultural harvester including a chopper drum rotatable about a horizontal axis, a housing for said drum provided with a forwardly open inlet for agricultural crops, said inlet having a top substantially on the level of the drum axis, conveyor means for feeding said crops to said inlet, and an outlet remote from said inlet for the discharge of crop material comminuted by said chopper, the combination therewith of a swinging gate disposed forwardly of said inlet above said conveyor means, said housing being provided with lateral extensions supporting said gate, said gate comprising a body of generally triangular cross-section in a vertical plane transverse to the drum axis, said body being pivotally secured to said extensions along a horizontal swing axis just above the level of said drum axis near one corner of the triangle and having a substantially planar front surface which depends substantially vertically from the region of said swing axis and terminates in a lower edge at another corner of said triangle in a position of closure of said gate while being swingable upwardly and rearwardly toward said inlet for unblocking the latter in an open position of said gate in which said surface extends nearly horizontally with said lower edge disposed at the top of said inlet, said body having at least one further surface extending rearwardly from said front surface toward the top of siad inlet in said position of closure and terminating in an edge at the third corner of the triangle, said extensions flanking said body in both said position of closure and said open position.

3. The combination defined in claim 2 wherein said body has a rounded edge in the region of said one corner above said swing axis.

4. The combination defined in claim 3 wherein said further surface extends from said rounded edge.

5. The combination defined in claim 4 wherein said body has a third surface curved about said swing axis and extending between the edges of said planar surface and said further surface remote from said swing axis.

6. The combination defined in claim 2 wherein said further surface extends from said lower edge and is curved about said swing axis.

7. The combination defined in claim 6 wherein said housing is provided with a ledge adjacent said further surface for stripping adhering matter from the latter upon a swinging of said body.

8. The combination defined in claim 2 wherein said housing is provided with abutments co-operating with at least one of said surfaces for limiting the swing of said body.

References Cited
UNITED STATES PATENTS

| | | | |
|---|---|---|---|
| 2,298,482 | 10/1942 | Holland et al. | 146—107 X |
| 2,491,661 | 12/1949 | Gruendler | 241—186 X |
| 3,039,505 | 6/1962 | Mast | 146—119 |

WILLIAM W. DYER, Jr., *Primary Examiner.*

W. GRAYDON ABERCROMBIE, *Examiner.*